US009443168B1

(12) United States Patent
Musial et al.

(10) Patent No.: US 9,443,168 B1
(45) Date of Patent: Sep. 13, 2016

(54) OBJECT DETECTION APPROACH USING AN ENSEMBLE STRONG CLASSIFIER

(71) Applicant: INTERNATIONAL BUSINESS MACHINES CORPORATION, Armonk, NY (US)

(72) Inventors: Pawel G. Musial, Tucson, AZ (US); Nalini K. Ratha, White Plains, NY (US); Jordan Soet, Vancouver (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/086,939

(22) Filed: Mar. 31, 2016

Related U.S. Application Data

(63) Continuation of application No. 14/986,298, filed on Dec. 31, 2015, now abandoned.

(51) Int. Cl.
G06K 9/62 (2006.01)
(52) U.S. Cl.
CPC .................... G06K 9/6217 (2013.01)
(58) Field of Classification Search
None
See application file for complete search history.

(56) References Cited

U.S. PATENT DOCUMENTS

| 8,515,184 | B1 | 8/2013 | Medasani et al. | |
| 8,588,519 | B2 | 11/2013 | Liu et al. | |
| 9,070,045 | B2 | 6/2015 | Dollar et al. | |
| 2008/0240504 | A1* | 10/2008 | Grosvenor | G06K 9/6256 382/103 |

OTHER PUBLICATIONS

Lefakis, Leonidas, and François Fleuret. "Joint cascade optimization using a product of boosted classifiers." Advances in neural information processing systems. 2010.*
Yu, Jaehoon, Ryoichi Miyamoto, and Takao Onoye. "A speed-up scheme based on multiple-instance pruning for pedestrian detection using a support vector machine." Image Processing, IEEE Transactions on 22.12 (2013): 4752-4761.*
Paul Viola, Rapid Object Detection using a Boosted Cascade of Simple Features, Proceedings of the 2001 IEEE Computer Society Conference on Computer Vision and Pattern Recognition (CVPR), 2001, vol. 1,I-511-I-518, IEEE.
Bourdev, Lubomir and Brandt, Jonathan. "Robust Object Detection Via Soft Cascade". Office of Technology, Adobe Systems, Inc., 345 Park Avenue, San Jose, CA 95110.
(Continued)

Primary Examiner — Stephen R Koziol
Assistant Examiner — Sean Conner
(74) Attorney, Agent, or Firm — Patents on Demand P.A.; Brian K. Buchheit; Scott M. Garrett

(57) ABSTRACT

An object detection method can begin with receipt of an ensemble classifier previously trained upon a binary dataset of images for an object. The ensemble classifier can be defined by a list, W, of N weak classifiers, $w_n$ for $n=1, \ldots, N$. The ensemble classifier can be trained as a detector for the object using a training dataset of images; each image can have a set of candidates having one or more known ground truth candidates. As a result of training, the weak classifiers can be reordered, based upon performance, into a new list, W', and a rejection threshold on candidate rank can be assigned for each detection stage. A cascading algorithm can be performed using the trained detector to detect the object in an image having known object candidates. The rejection threshold for a stage of the cascading algorithm can be applied to a rank of the object candidates.

1 Claim, 2 Drawing Sheets

(56) References Cited

OTHER PUBLICATIONS

Zhang, Cha and Viola, Paul. "Multiple-Instance Pruning for Learning Efficient Cascade Detectors" Microsoft Research, One Microsoft Way, Redmond, VA 98052.

Sochman, Jan and Jiti Matas. "Waldboost—Learning for Time Constrained Sequential Detection". Center for Machine Perception, Dept. of Cybernetics, Faculty of Elec. Eng., Czech Technical University in Prague, Karlovo nam. 13, 121 35 Prague, Czech Rep.; Printed in Cvpr '05, San Diego, CA Jun. 20-25.

* cited by examiner

OBJECT DETECTION APPROACH USING AN ENSEMBLE STRONG CLASSIFIER

CROSS-REFERENCE TO RELATED APPLICATIONS

This application is a Continuation of U.S. patent application Ser. No. 14/986,298, filed 31 Dec. 2015 (pending), which is incorporated herein in its entirety.

BACKGROUND

The present invention relates to the field of object detection and, more particularly, to an improved object detection approach using an ensemble classifier.

Object detection is a growing field for image processing systems. Accuracy and speed or computational cost are the typical trade-offs in the approaches used. That is, higher accuracy of detection means more comparisons and/or more candidates, which increases the time and resources required by the process.

Because of this balance, it has become popular to reduce search costs using an ensemble classifier and a cascaded approach to eliminate candidates based on subsets of weak classifiers, without unfolding the entire ensemble classifier. This type of approach, such as the multiple instance pruning (MIP) algorithm, uses the minimum score of all ground truth candidates observed across training images and detected by the ensemble classifier to eliminate candidates in each cascade stage. Use of the lower bound, minimum score, as the rejection threshold of a stage still allows a certain number of negative candidates to be accepted, which actually increases the computational cost without increasing accuracy.

BRIEF SUMMARY

One aspect of the present invention can include an object detection method that begins with receipt of an ensemble classifier previously trained upon a binary dataset of images for an object. The ensemble classifier can be defined by a list, W, of N weak classifiers, $w_n$ for n=1, ..., N. The list of weak classifiers can be arranged in a default order. Execution of the ensemble classifier can successively execute the weak classifiers in the order listed. The ensemble classifier can be trained to be a detector for the object using a training dataset of images. Each image in the training dataset can have a set of candidates that includes at least one known ground truth candidate. As a result of said training, the weak classifiers defining the ensemble classifier can be reordered, based upon performance, into a new list, W'. A rejection threshold on candidate rank can be assigned, together with a corresponding weak classifier, for each detection stage. A cascading algorithm can be performed using the trained detector to detect the object in an image having known object candidates. The rejection threshold for a stage of the cascading algorithm can be applied to a rank of the object candidates. An acceptance of negative object candidates and a computational cost of the object detection can be reduced as compared to using a minimum cumulative score value as the rejection threshold of the stage.

Another aspect of the present invention can include an object detection method that begins by receiving an ensemble classifier previously trained upon a binary dataset of images for an object. The ensemble classifier can be defined by a list, W, of N weak classifiers, $w_n$ for n=1, ..., N. The list of weak classifiers can be arranged in a default order. Execution of the ensemble classifier can successively execute the weak classifiers in the order listed. The ensemble classifier can be trained to be a detector for the object using a training dataset of images. Each image in the training dataset can have a set of candidates that includes at least one known ground truth candidate. As a result of said training, the weak classifiers defining the ensemble classifier can be reordered, based upon performance, into a new list, W'. A rejection threshold on candidate rank can be assigned, together with a corresponding weak classifier, for each detection stage. A cascading algorithm can be performed using the trained detector to detect the object in an image having known object candidates. Performance of the cascading algorithm can include executing the weak classifiers of W' upon a set of object candidates in N successive stages. A cumulative score for each object candidate can be maintained. The set of object candidates can be arranged in descending order of their cumulative score. The rejection threshold assigned to the stage during training of the detector can be applied to the ranks of the object candidates. An acceptance of negative object candidates can be reduced. Object candidates having a cumulative score ranking below the rejection threshold can be removed from the set of object candidates. The size of the set of object candidates can decrease with each stage.

Yet another aspect of the present invention can include a computer program product that includes a computer readable storage medium having embedded computer usable program code. The computer usable program code can be configured to receive an ensemble classifier that was previously trained upon a binary dataset of images for an object. The ensemble classifier can be defined by a list, W, of N weak classifiers, $w_n$ for n=1, ..., N, arranged in a default order. Execution of the ensemble classifier can successively execute the weak classifiers in the order listed. The computer usable program code can be configured to train the ensemble classifier to be a detector for the object using a training dataset of images. Each image in the training dataset can have a set of candidates that includes at least one known ground truth candidate. As a result of said training, the weak classifiers defining the ensemble classifier can be reordered, based upon performance, into a new list, W'. A rejection threshold on candidate rank can be assigned, together with a corresponding weak classifier, for each detection stage. The computer usable program code can be configured to perform a cascading algorithm using the trained detector to detect the object in an image having known object candidates. The rejection threshold for a stage of the cascading algorithm can be applied to a rank of the object candidates. An acceptance of negative object candidates and a computational cost of the object detection can be reduced as compared to using a minimum cumulative score value as the rejection threshold of the stage.

DETAILED DESCRIPTION

Figure 1:
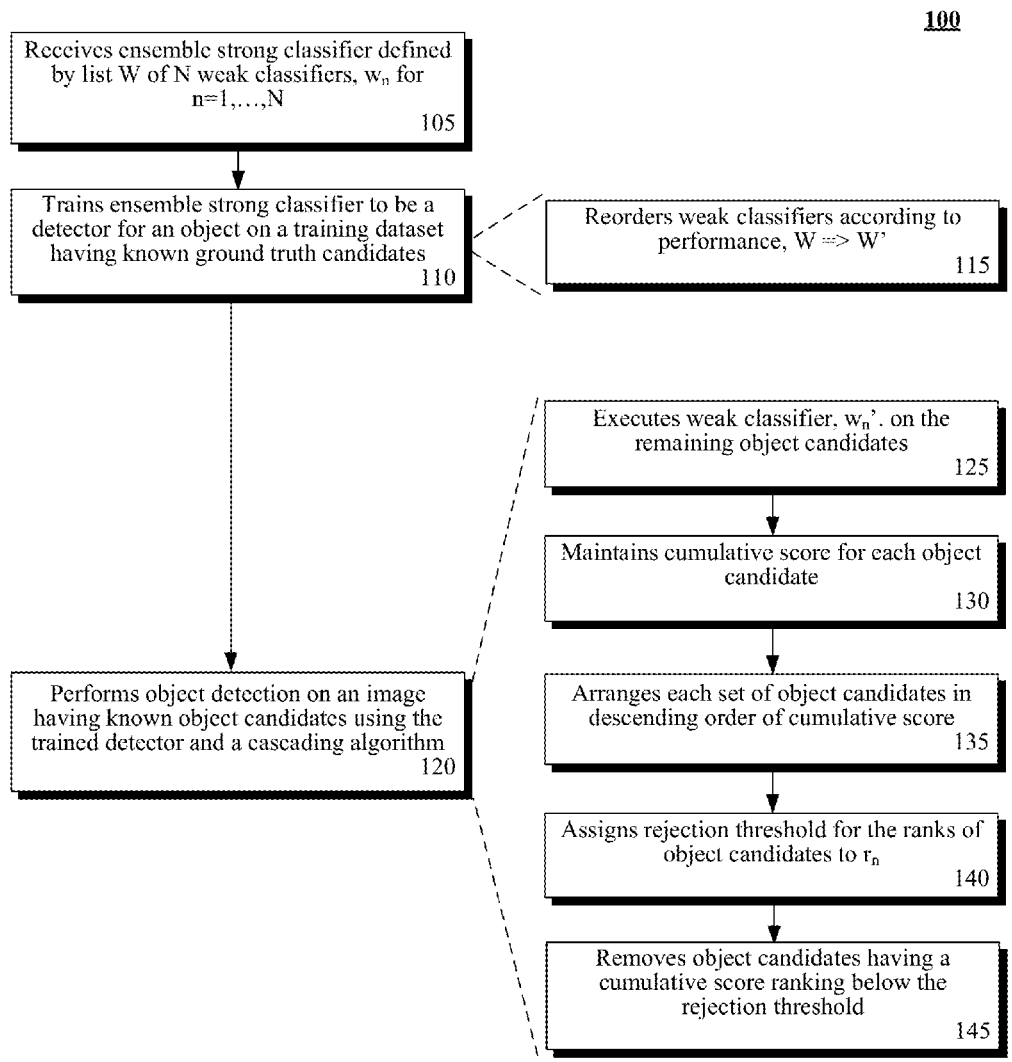
FIG. 1 is a flowchart of a method describing an improved objection approach in accordance with embodiments of the inventive arrangements disclosed herein.

The present invention discloses a solution for reducing the computational cost of using an ensemble classifier and a cascading algorithm for object detection. The ensemble classifier can be defined by a list, W, of weak classifiers in a default order. The ensemble classifier can be trained to be a detector for an object using a training dataset that has known ground truth candidates. As a result of the training, the weak classifiers of the ensemble classifier can be reordered in a list, W', according to performance. The trained detector can then be used in conjunction with a cascading algorithm to detect the object in a new image. In each stage of the cascading algorithm, the rejection threshold of the stage can be applied to ranks of the remaining object candidates.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of a method 100 describing an improved objection approach in accordance with embodiments of the inventive arrangements disclosed herein. Method 100 can be performed within the context of an object detection system that utilizes an ensemble classifier.

Method 100 can begin in step 105 where the ensemble classifier can be received for use in object detection. As is known in the Art, the ensemble classifier can be defined by a list, W, of N weak classifiers, $w_n$ for n=1, . . . , N. The ensemble classifier can have been previously trained using binary training data for the object (i.e., images that contain or do not contain the desired object). The list of weak classifiers, W, comprising the ensemble classifier can be a result of this binary training.

The ensemble classifier can be trained to be a detector for the object using a training dataset having known ground truth candidates in step 110. In other contemplated embodiments, step 110 can be omitted. Training can include the execution of step 115 where the weak classifiers are reordered according to performance. The rejection threshold on candidate rank for a given stage can be defined as the lowest rank, over all training images, of the ground truth candidate. In each stage of training, the optimal weak classifier can be selected as the weak classifier with the highest rejection threshold among the remaining weak classifiers, leading to the greatest reductions in computational cost. The optimal weak classifier can be moved from list W to list W'; list W' can include the same weak classifiers as W, except in order by optimal performance and not a default order.

For example, W can include $w_1$, $w_2$, and $w_3$ (for N=3). Upon completion of step 110 and 115, W' can include $w_1'$, $w_2'$, and $w_3'$ (also for N=3). However, $w_1$ need not equal $w_1'$; $w_2$ need not equal $w_3'$; and $w_3$ need not equal $w_3'$. That is, in terms of W, W' can be ordered as $w_3$, $w_1$, and $w_2$.

It should be noted that step 110 can be lacking from existing object detection approaches. The proposed approach can apply the rejection threshold to candidate rank and not cumulative, as is done in conventional approaches. Further, the weak classifiers can be reordered according to optimal rejection thresholds on candidate rank, not cumulative score. Because conventional object detection approaches focus on a candidate's score, negative object candidates can be allowed to pass through to subsequent stages, which unnecessarily inflates the quantity of candidates that need to be processed in those subsequent stages.

Thus, the training performed upon the ensemble classifier in step 110 can increase the efficacy of the object detection process, decreasing the overall computational cost required for object detection.

In step 120, object detection can be performed on an image having known object candidates using the trained detector of step 110 and a cascading algorithm. The image can have a constant number of object candidates and a predefined number of objects to be searched. To accomplish this, the search region can be limited to a standardized sub-region of the image with a predefined aspect ratio.

In another contemplated embodiment, the steps of method 100 can be used for general object detection with a predefined upper bound on the number of objects of the same class present in an image. In this embodiment, the search region can cover the whole image and the aspect ratio can vary, which means that the number of object candidates will vary from image to image.

Step 120 can include steps 125-145. For each stage (n=1, . . . , N) of the cascading algorithm, the weak classifier, $w_n'$, can be executed on the set of remaining object candidates in step 125.

In step 130, a cumulative score can be maintained for each object candidate. As is known in the Art, the cumulative score can be the summation of the values that were subsequently produced by the weak classifiers prior to the current stage. Prior to the performance of the object detection process, all cumulative scores can be initialized to zero.

Each set of object candidates can be arranged in descending order of their cumulative score in step 135. In step 140, the rejection threshold of the stage produced in step 110 can be applied to the ranks of object candidates, as determined in step 135. Object candidates having a cumulative score ranking below the rejection threshold can be removed from the set of object candidates in step 145.

It should be emphasized that conventional object detection approaches typically utilize the overall minimum cumulative score as the rejection threshold for a stage. By using the overall lowest rank of the ground truth candidate as the rejection threshold, the target detection rate for the ensemble classifier can be preserved throughout the stages. Further, the use of the lowest ground truth candidate rank as the rejection threshold can provide additional computational cost savings.

While the steps of method 100 can describe the detection process for a single object, the approach taught can be expanded to detect multiple objects. In such an embodiment, step 110 can be independently performed for each number of objects being detected with a dedicated training dataset. For general detection of multiple objects, percentiles can be used instead of rank, where the percentile can be defined as the ratio of the rank and the number of object candidates of the image.

Figure 2:
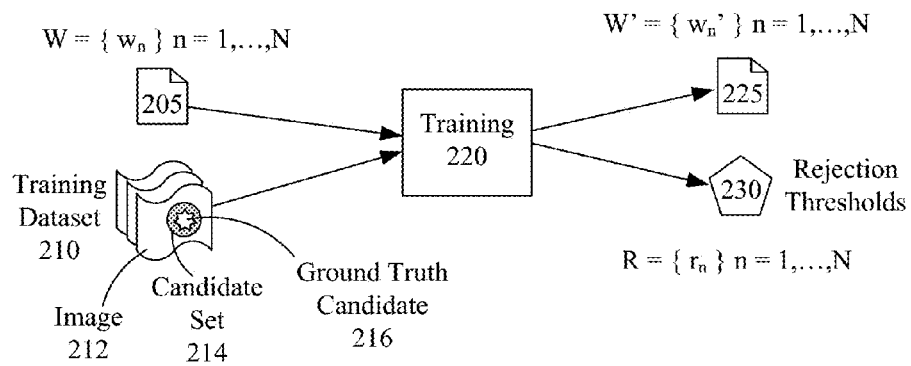
FIG. 2 presents illustrations that visually depict the key points of the improved object detection approach in accordance with embodiments of the inventive arrangements disclosed herein.
Figure 2:
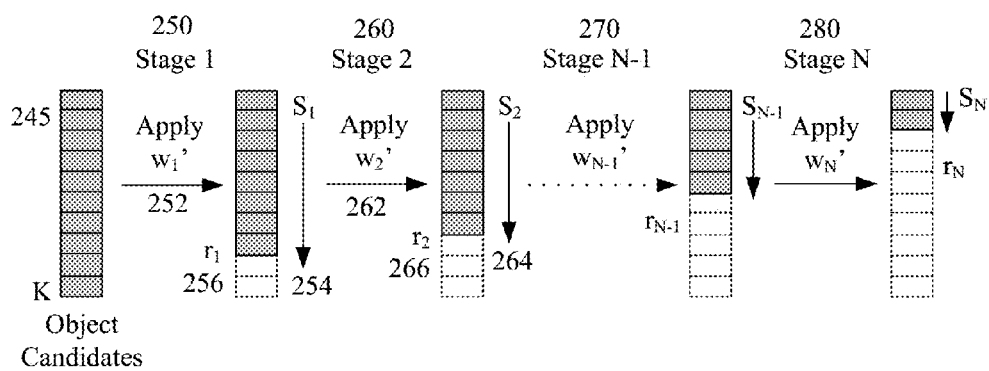

FIG. 2 presents illustrations 200 and 235 that visually depict the key points of the improved object detection approach in accordance with embodiments of the inventive arrangements disclosed herein. Illustrations 200 and 235 can describe steps of method 100.

In illustration 200, the ensemble classifier, represented by the list 205 of weak classifiers, and the training dataset 210 can be the inputs to the training process 220 like step 110 of method 100. Each image 212 of the training dataset 210 can have a set of candidates 214. The candidate set 214 of each image 212 can be the same size. Each candidate set 214 can have one or a predefined number of ground truth candidates 216 at known positions.

The training process 220 can produce a reordered list 225, W', of weak classifiers for the ensemble classifier and a corresponding list 230 of rejection thresholds, $r_n$. The training process 220 can determine the rejection thresholds 230 using the ground truth candidates 216 in the training dataset 210. That is, the rejection threshold 230 of a stage can be set as the lowest rank, across all training images, of the ground truth candidate 216. An optimal weak classifier can be selected as the weak classifier having the highest rejection threshold 230 among all remaining weak classifiers, leading to the greatest reduction in computational cost. The optimal weak classifier can be moved from list W 205 to list W' 225.

Illustration 235 can demonstrate the use of the trained ensemble classifier for object detection using a cascading algorithm on a set of object candidates 245 like that described in step 120 of method 100. At the beginning of the process, the set can have K object candidates 245, where K is a known integer.

In stage 1 250, weak classifier $w_1'$ can be applied 252 to the set of object candidates 245, which produces an initial score, $S_1$, kept for each object candidate 245. The object candidates 245 can then be arranged 254 in descending order by their cumulative scores, $S_1$. Those object candidates 245 ranking below the rejection threshold, $r_1$, can be removed 256 from the set of object candidates 245.

The remaining object candidates 245 of the set can proceed to stage 2 260. The weak classifier $w_2'$ can be applied 262 to the smaller set of object candidates 245, producing intermediate scores that are added to the initial score to produce a cumulative score, $S_2$. The object candidates 245 can be arranged 264 by their cumulative scores, $S_2$, and those object candidates 245 not meeting the threshold of $r_2$ can be removed 266.

These steps can be repeated using the weak classifiers of W' in successive stages until stage N−1 270 and stage N 280 have been performed. Upon the completion of stage N 280, the set of object candidates 245 can be comprised of those object candidates 245 where the ensemble classifier has detected the desired object.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising;

receiving an ensemble classifier previously trained upon a binary dataset of images for an object, wherein the ensemble classifier is defined by a list, W, of N weak classifiers, $w_n$ for n=1, . . . , N, wherein the list of weak classifiers are arranged in a default order, wherein execution of the ensemble classifier successively executes the weak classifiers in the order listed;

training the ensemble classifier to be a detector for the object using a training dataset of images, wherein each image in the training dataset has a set of candidates that includes at least one known ground truth candidate, wherein said training comprises:

determining a rejection threshold for each of the weak classifiers, wherein the rejection threshold for a particular weak classifier is a lowest score of the at least one known around truth candidate over all of the images in the training dataset;

assigning a rank to each of the weak classifiers from a weak classifier determined to have the highest rejection threshold to a weak classifier determined to have the lowest rejection threshold; and reordering the weak classifiers defining the ensemble classifier into a new list, W', according to the rank associated with each corresponding weak classifier;

performing a cascading algorithm using the trained detector to detect the object in an image having a known set of object candidates, said performance further comprising:

executing the weak classifiers of W' upon a set of object candidates in N successive stages, wherein a cumulative score for each object candidate is maintained;

arranging the set of object candidates in descending order of their cumulative score;

applying the rejection threshold to ranks of the object candidates, wherein an acceptance of negative object candidates is reduced; and removing object candidates having a cumulative score ranking below the rejection threshold from the set of object candidates, wherein a size of the set of object candidates decreases with each stage.

* * * * *